US010530962B2

(12) United States Patent
Shaw

(10) Patent No.: US 10,530,962 B2
(45) Date of Patent: *Jan. 7, 2020

(54) GENERATION OF IMAGES AT LOWER RESOLUTION

(71) Applicant: Hewlett-Packard Development Company, L.P., Houston, TX (US)

(72) Inventor: Mark Shaw, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/155,217

(22) Filed: Oct. 9, 2018

(65) Prior Publication Data

US 2019/0045081 A1    Feb. 7, 2019

Related U.S. Application Data

(63) Continuation of application No. 15/515,267, filed as application No. PCT/US2014/057982 on Sep. 29, 2014, now Pat. No. 10,129,434.

(51) Int. Cl.
*G06T 3/40* (2006.01)
*H04N 1/393* (2006.01)

(52) U.S. Cl.
CPC .......... *H04N 1/3935* (2013.01); *G06T 3/40* (2013.01)

(58) Field of Classification Search
None
See application file for complete search history.

(56) References Cited

U.S. PATENT DOCUMENTS

| 5,054,100 | A  | 10/1991 | Tai |
| 6,816,166 | B2 | 11/2004 | Shimizu |
| 7,430,342 | B2 | 9/2008 | Nabeshima |
| 7,613,363 | B2 | 11/2009 | Platt et al. |
| 7,706,635 | B2 | 4/2010 | Keithley et al. |
| 8,400,670 | B2 | 3/2013 | Rueby |
| 8,731,318 | B2 | 5/2014 | Keshet et al. |
| 2003/0048272 | A1 | 3/2003 | Gormish |

FOREIGN PATENT DOCUMENTS

| JP | 2008227749 | 9/2008 |
| JP | 2009232369 | 10/2009 |
| JP | 2011188195 | 9/2011 |
| JP | 2014090272 | 5/2014 |
| WO | WO-2013084233 A1 | 6/2013 |

OTHER PUBLICATIONS

International Searching Authority. ISA/KR. International Search Report. dated May 14, 2015, Application No. PCT/US2014/057982 Filing date Sep. 29, 2014.

(Continued)

*Primary Examiner* — Paul F Payer
(74) *Attorney, Agent, or Firm* — HP Inc. Patent Department

(57) ABSTRACT

Examples include acquisition of an input image, generation of a first output pixel and a second output pixel based on a first set and a second set of input pixels, selective reassigning of a gray value of at least one of the first and second output pixels, and generation of an output image based on the output pixels at a second resolution lower than the first resolution.

13 Claims, 4 Drawing Sheets

(56) References Cited

OTHER PUBLICATIONS

Pant S. et al., "A Local Technique for Contrast Preserving Medical Image Enhancement," (Research Paper), Proceedings for SPIE ~ vol. 9043, Mar. 21, 2014 ~ 7 pages.
Rangarajan P. et al., "Detail-preserving Contrast Reduction for Still Cameras," (Research Paper), May 23, 2006, found at http://lyle.smu.edu/ ~ 4 pages.
Ting H. et al., "Edge Preserving Interpolation of Digital Images Using Fuzzy Inference," (Research Paper), Jul. 9, 1997, found at http://front.cc.nctu.edu.tw/~46 pages.

GENERATION OF IMAGES AT LOWER RESOLUTION

BACKGROUND

Image scaling may result in gray pixels being added to image content (e.g., due to interpolation). These gray pixels can result in the appearance of unwanted non-uniform edges, especially when exposed to half-toning processes, such as when printing.

BRIEF DESCRIPTION OF THE DRAWINGS/FIGURES

DETAILED DESCRIPTION

Figure 1:
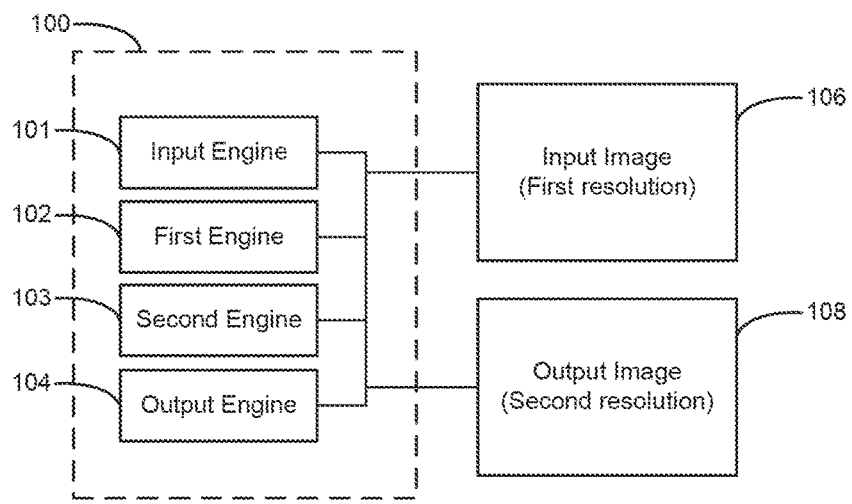
FIG. 1 is a block diagram of a device including a plurality of engines according to an example.

Examples described herein enable printing of a scaled output image based on an input image, applying edge-preserving image scaling with minimal computational overhead, and avoiding unwanted/spurious gray pixels while enjoying fast scaling. Thus, examples may scale images to meet performance needs, such as for real-time print operations. For example, a print engine may have a first print speed, associated with a first resolution, and a second print speed associated with a second resolution, with the second print speed being faster than the first print speed. Use of the second resolution may therefore enable printing applications not available with the first resolution, while still preserving image qualities that are not degraded by the scaling. Image quality of an original document may be preserved, while running image scaling at desired print speeds (e.g., in an embedded device or hardware-based application-specific integrated circuit (ASIC)). Scaling may be applied to an input image based on a first resolution (dots per inch (DPI)), such as an image that is equal resolution in both axes/dimensions, to produce an output image having a lesser DPI in at least one of the axes. For example, downscaling may be used to reduce 600 DPI to 400 DPI along one axis, reducing data of 3-pixel groups into 2-pixel groups. A grey level/value of the resulting 2-pixel output group may be determined from the original 3-pixel input group, in conjunction with the use of an extra 2 pixels, one on each side of the 3-pixel input group. The average gray tone/value of the original 3-pixel group may be compared to the average gray tone/value of the resulting 2-pixel output group, and further correction may be made as appropriate to the 2-pixel output group.

Unlike the examples described herein, other simple scaling algorithms (such as linear interpolation, or pixel sub-sampling) may result in a variety of quality problems, such as the loss of fine detailed information when sub-sampling an image. Thus, such pixel replication/sub-sampling can produce inferior image quality. Some techniques, such as linear and bi-linear interpolation, may be acceptable for preserving the average appearance of the image, but will result in the conversion of thin solid black lines into gray pixels, introducing a negative impact on print quality. Template matching is another approach, whereby a signature of the pixels under evaluation is used to determine the output image. However, the computational cost of such an approach is very high due to the high degree of conditional logic, causing a printer to slow down in order to process the image information.

Examples described herein may prevent such image quality issues/artifacts in output images, by taking into account additional features (such as the edge contrast etc.) that are not limited to an average gray value of the pixels being scaled. Thus, example approaches may preserve a single-pixel line that has been rendered, preserving very fine input image details. The example approaches may be used for complex applications such as architectural drawings having thin lines (e.g., down to one-pixel thicknesses), by preserving detailed characteristics of even one-pixel lines, and various other high-contrast details. The example approaches are also suitable for text, by preserving fine pixel lines including font serifs and kanji characters, even down to 4-point and 2-point font renderings whether white-on-black text or black-on-white text. Example approaches also may preserve other (e.g., non-line) details, including gradients, pictures, photographs, images of faces, and other details, and may apply to black-and-white, grayscale, and/or color.

FIG. 1 is a block diagram of a device 100 including a plurality of engines 101-104 according to an example. The input engine 101 may receive the input image 106, associated with a first resolution. The first engine 102 and the second engine 103 may process the input image 106 and provide the processed input image 106 to the output engine 104. The output engine 104 may generate output image 108, associated with a second resolution. In alternate examples, the input image 106 and/or the output image 106 may be processed by at least one of the engines 101-104.

Figure 2:
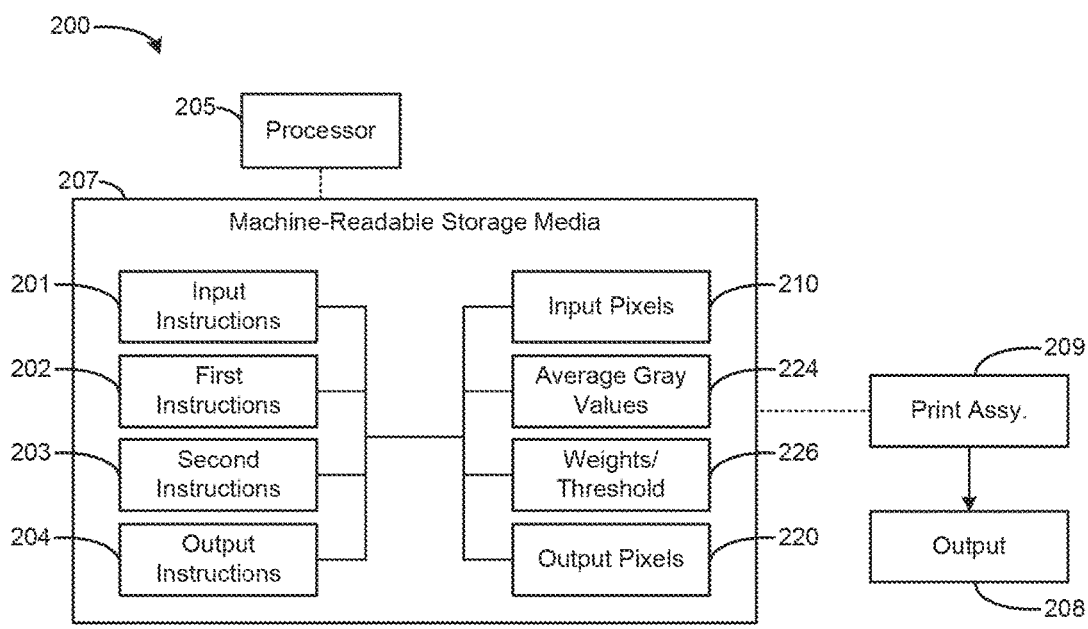
FIG. 2 is a block diagram of a system including a plurality of instructions according to an example.

The device 100 may include an image processing device (such as a print device/assembly as described below regarding FIG. 2) and/or a computing device. As used herein, a "computing device" may represent at least a portion of an image processing device, and also may represent a device such as desktop computer, laptop (or notebook) computer, workstation, tablet computer, mobile phone, smart device, server, blade enclosure, or any other processing device or equipment. An engine of device 100 may be any combination of hardware and programming, to implement the functionalities of the engine. In examples described herein, combinations of hardware and programming may be implemented in a number of different ways. For example, the programming for the engines may be processor-executable instructions stored on a non-transitory machine-readable storage media (e.g., machine-readable media 207 as illustrated in FIG. 2), and the hardware for the engines may include a processing resource (e.g., processor 205) to execute those instructions. In such examples, the machine-readable storage media may store instructions that, when executed by the processing resource, implement engines 101-104. In such examples, device 100 may include the machine-readable storage media storing the instructions and the processing resource to execute the instructions. The machine-readable storage media may be separate but accessible to device and the processing resource. In some examples, at least one of the engines 101-104 may be associated with a RIP engine and/or print engine of a laser printer.

In some examples, the instructions associated with an engine may be part of an installation package that, when installed, can be executed by the processing resource to implement engines 101-104. In such examples, the machine-readable storage media may be a portable media, such as a CD, DVD, or flash drive, or a memory maintained by a server from which the installation package can be downloaded and installed. In other examples, the instructions may be part of an application, applications, or component already installed at device 100, including the processing resource. In such examples, the machine-readable storage media may include memory such as a hard drive, solid state drive, or the like. In other examples, the functionalities of any engines of device 100 may be implemented in the form of electronic circuitry. In some examples, functionalities described herein in relation to FIG. 1 may be provided in combination with functionalities described herein in relation to any of FIGS. 1-5.

The input image 106 and the output image 108 may be any suitable type of electronic file, document, graphic, or other electronic representation of content based on a resolution unit (e.g., a pixel) that may be associated with a resolution (of the pixel unit and/or the entire image). For example, images 106, 108 may be an electronic image file such as a bitmap, a vector, a joint photographic experts group (JPEG), a tagged image file format (TIFF), a graphics interchange format (GIF), a portable network graphics (PNG), a printer-specific image file used by a RIP/printing engine, or the like. In addition to graphical resolution pixel information, in some examples, images 106, 108 may further comprise additional information, such as metadata corresponding to the image. Accordingly, examples provided herein may update such metadata as appropriate, corresponding to updated DPI information or other resolution information that may be affected by scaling operations that are performed on the input image.

FIG. 2 is a block diagram of a system 200 including a plurality of instructions 201-204 according to an example. The system 200 also includes a processor 205, machine-readable media 207, a print assembly 209, and output 208. The machine-readable media 207 is associated with input instructions 201, first instructions 202, second instructions 203, output instructions 204, input pixels 210, average gray values 224, weights/threshold 226, and output pixels 220. In an example, the input instructions 201 may receive the input pixels 210, and the first instructions 202 and second instructions 203 may generate and/or use the average gray values 224, the weights/threshold 226, and the output pixels 220. The output instructions 204 may use output pixels 220 to provide an output image, which may be printed as output 208. In alternate examples, the input pixels 210, the average gray values 224, the weights/thresholds 226, the output pixels 220 and/or any other aspects associated with an input and/or output image may be processed by at least one of the instructions 201-204.

Figure 5:
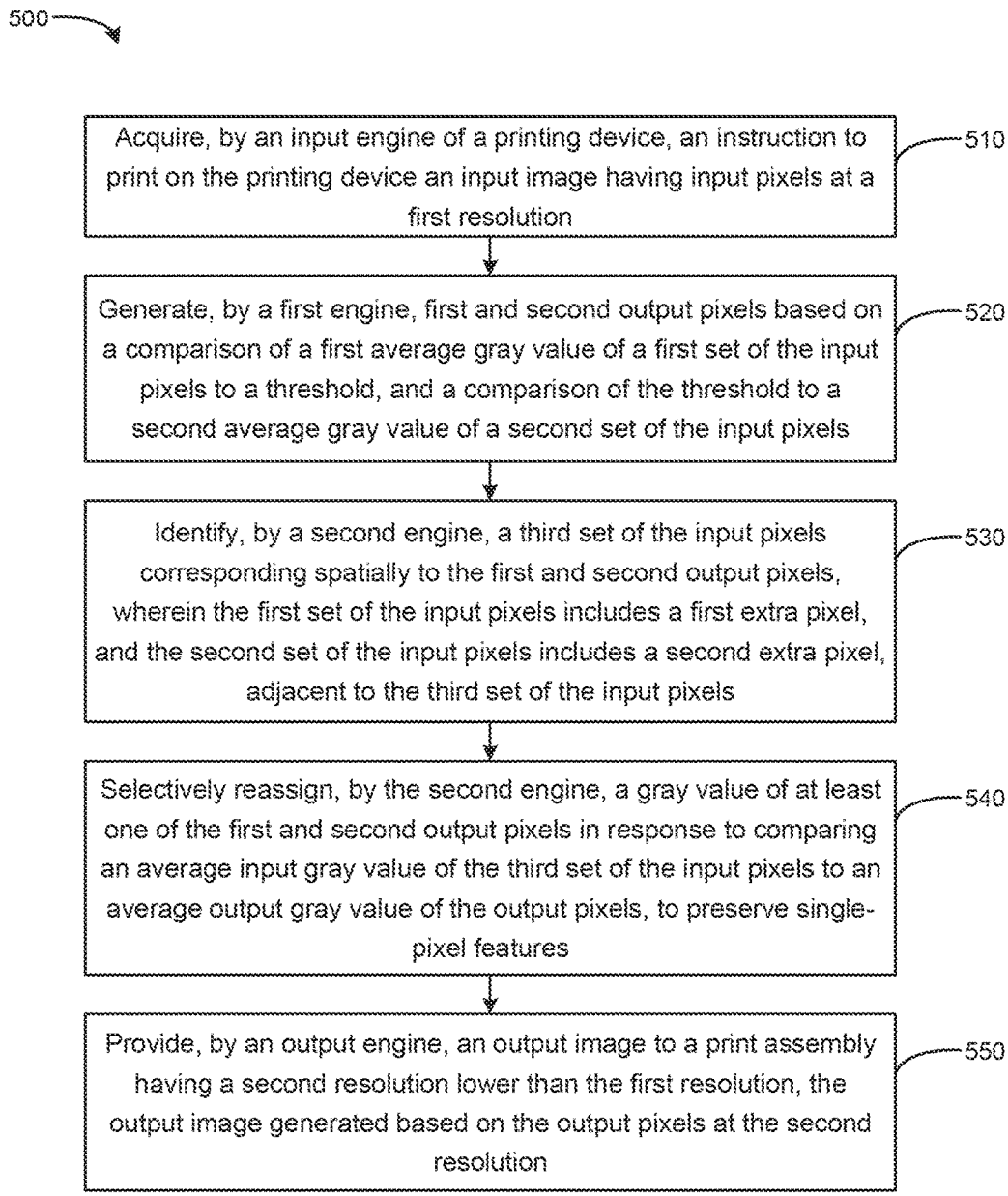
FIG. 5 is a flow chart based on generating output pixels according to an example.

In some examples, instructions 201-204 may correspond to engines 101-104 of FIG. 1, and may correspond to the flow chart of FIG. 5. Thus, operations performed when instructions 201-204 are executed by processor 205 may correspond to the functionality of engines 101-104. The machine-readable storage media 207 is encoded with instructions 201-204 executable by processor 205. In some examples, storage media 207 may include additional instructions. In some examples, instructions 201-204, and any other instructions described herein in relation to storage media 207, may be stored on a machine-readable storage media that is remote from and accessible to (e.g., via a computer network) system 200 and processor 205. In some examples, instructions 201-204 may be instructions of a computer program, computer application ("app"), agent, or the like, of system 200.

In examples described herein, the term "processor" may include a processing resource such as, for example, one processor or multiple processors included in a single computing device or distributed across multiple computing devices. The term processor also may be at least one of a central processing unit (CPU), a semiconductor-based microprocessor, a graphics processing unit (GPU), a field-programmable gate array (FPGA) configured to retrieve and execute instructions, an application-specific integrated circuit (ASIC), and/or other electronic circuitry suitable for the retrieval and execution instructions stored on a machine-readable storage media, or a combination thereof. Processor 205 may fetch, decode, and execute instructions stored on storage media 207 to perform the functionalities described herein. In other examples, the functionalities of any of the instructions of storage media 207 may be implemented in the form of electronic circuitry, in the form of executable instructions encoded on a machine-readable storage media, or a combination thereof.

As used herein, a "machine-readable storage media" may be any electronic, magnetic, optical, or other physical storage apparatus to contain or store information such as executable instructions, data, and the like. For example, any machine-readable storage media described herein may be any of Random Access Memory (RAM), volatile memory, non-volatile memory, flash memory, phase-change memory, memristor-based memory, a storage drive (e.g., a hard drive), a solid state drive, any type of storage disc (e.g., a compact disc, a DVD, etc.), and the like, or a combination thereof. Further, any machine-readable storage media described herein may be non-transitory.

In examples described herein, a "print assembly" may be a hardware device, such as a printer, multifunction printer (MFP), copier, fax, scanner, three-dimensional (3-D) printer, or any other image-related device including at least functionalities to physically produce graphical representation(s) (e.g., text, images, etc.) on paper, 3-D print media, or the like. In some examples, an MFP may be capable of performing a combination of multiple different functionalities such as, for example, printing, photocopying, scanning, faxing, etc. In examples described herein, a printing device may be capable of communicating over a computer network, such as the internet, or the like. Such a printing device may be referred to herein as a "web-connected" printing device.

Example systems 200 and/or devices, such as embedded print devices, may be optimized to perform at high data rates to print images/content at a rate approaching a mechanical capability of the device. Example devices may include a Raster Image Processor (RIP), whose performance may depend on a number of factors, including processor speed, memory footprint, calculation and/or floating point performance, and so on. Thus, to provide improved print speed in example devices/systems 200, including RIP-based printer devices, it would seem that increased compute power and memory capability would be needed for enhancing device speed, which may pose additional costs. However, in some examples, device speed also may be enhanced by speeding up a physical marking portion of the device, by moving print media relatively faster through the device, compared to the RIP operation, while printing a reduced-resolution image whose resolution is scaled as a function of the relative speed increase of the print media. For example, a printer may resize a 600×600 dots per inch (DPI) resolution input image into a 600×400 resolution output image, and print the resized output image onto output paper that is moved proportionately faster than usual, thereby causing the 600×400 image to cover an entire 600×600 worth of space on the paper. Thus, the same spatial area as the input image may be covered by the output image, while using less vertical information in the output image, by decreasing vertical resolution of the output image by a scaling factor, and increasing paper throughput in proportion to the scaling factor (e.g., proportional downscaling and paper throughput increase). Accordingly, the speed of printing increase may be proportional to the downscaling of the image. For example, the scaling may achieve a one-third downscale (e.g., based on a 3:2 pixel scaling), resulting in a one-third speed increase of a print engine in a printer.

More specifically, the RIP of an example device/printer may be optimized to render a printed page at a resolution of 600×600 DPI, and the printer mechanics may be optimized to accept 600×400 DPI to achieve optimal speed. Accordingly, the example device/system may scale the input image from 600 DPI to 400 DPI along a first dimension (the y-axis) to correspond to the increased throughput of the printer mechanics, without introducing print quality artifacts. Scaling enables flexibility of overcoming particularities of a given RIP engine that may be in a given printer, to optimize for such a non-isotropic resolution (having different resolutions along first and second dimensions/axes). Other pixel resolutions are possible, such as downscaling 1200 DPI to 800 DPI, 300 DPI to 200 DPI, and other factors of 3:2. Various resolutions are supported, including those that are not perfect multiples of 3 and/or 2. For example, an input resolution of 800 DPI may be scaled to an output resolution of 533 DPI. Approaches may crop away or pad additional lines onto images for applying the downscaling approaches. For example, an approach may begin converting three input pixel lines to two output pixel lines. At the end of the input image, if one or two lines remain, the algorithm may discard those lines and finalize the output pixels, or add extra padding to the remaining input lines and apply the downscale approach to that padded row.

Although a print assembly 209 is illustrated in FIG. 2, alternate examples may produce output in the form of non-printed output images on a device having a display, such as a smartphone, tablet, laptop, graphics card, computer-aided drafting (CAD), printer control panel for a display, or other device/application that may display the output 208. Regardless of particular type of output 208, examples may preserve edge contrast without introducing gray/soft edges and losing details. Examples may be achieved in a physical printer, and also in a software printer driver that is to scale the input information (e.g., in a computing system running the printer driver) and send the pre-scaled information to printer hardware device. Examples also may be applied to anti-aliasing in full-color graphics applications, such as by a discrete video card/GPU of a computing system.

Figure 3:
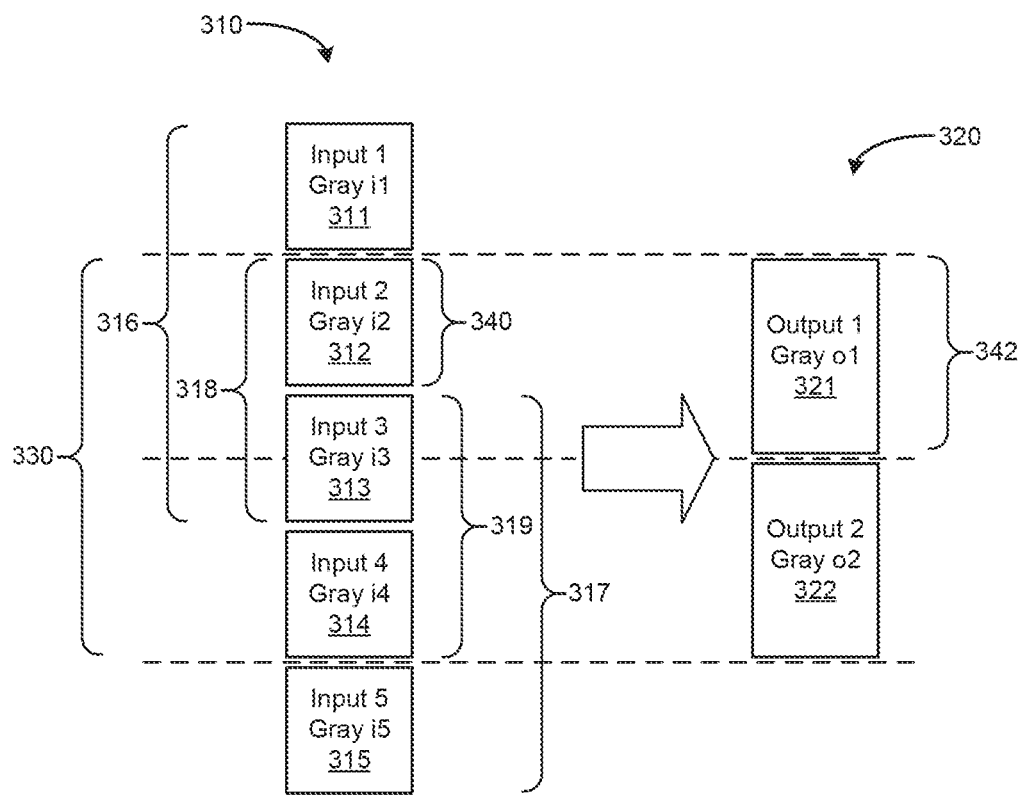
FIG. 3 is a block diagram of a plurality of input pixels and output pixels according to an example.

FIG. 3 is a block diagram of a plurality of input pixels 310 and output pixels 320 according to an example. The input pixels 310 are associated with a first resolution 340, and include input 1 311 with associated gray value gray i1, input 2 312 with associated gray value gray i2, input 3 313 with associated gray value gray i3, input 4 314 with associated gray value gray i4, and input 5 315 with associated gray value gray i5. The input pixels 310 also are designated as including a first set of input pixels 316 (i1, i2, i3), a second set of input pixels 317 (i3, i4, i5), and a third set of input pixels 330 (i2, i3, i4). The first set of input pixels 316 include a first subset 318 (i2, i3), and the second set of input pixels 317 include a second subset 319 (i3, i4). The output pixels 320 are associated with a second resolution 342, and include output 1 321 with associated gray value gray o1, and output 2 322 with associated gray value gray o2.

The input pixels 310 and output pixels 320 may be associated with numerical grayscale values, to represent an associated grayscale value attributed to that pixel. The grayscale values may be represented as appropriate according to a bit depth (1-bit, 8-bit, 16-bit, etc.). For example, in an 8-bit grayscale bit depth, a value of zero may correspond to black, a value of 255 may correspond to white, and values between zero and 255 may represent shades of gray (e.g., 50% gray corresponds to 127).

The input pixels 310 are illustrated having a relatively shorter height than the output pixels 320, according to a first resolution 340 along the vertical axis of the input pixels 310, and a second resolution 342 along the vertical axis of the output pixels 320. The pixel shapes are illustrated as blocks for convenience, including square and rectangular blocks. However, the examples are not so limited, and may provide the output as squares, circles, ovals, rectangles, or any other geometric shapes. For example, a given printer may represent pixels as different shaped ovals. The rectangle and square shapes are shown for visual representation purposes and ease of understanding, e.g., illustrating a 3:2 correspondence between input:output vertical resolutions, which may enable speeding up a speed of paper to be printed with the output pixels 320. Thus, general pixel dimensions are not limited to particular relationships along different dimensions, regardless of whether a pixel is squared or curved in shape.

Scaling the input pixels 310 from the first resolution 340 to the second resolution 342 may reduce an impact on memory, processing, and other resources, improving computational efficiency. Furthermore, examples described herein may consider a manageable number of input pixels 310 when determining the output pixels 320, avoiding the possibility of over-burdening device resources and maintaining efficient operation. Extra input pixels (input 1 311 and input 5 315) also may be considered, even though they are spatially beyond the three input pixels (input 2 312, input 3 313, and input 4 314 denoted as third set of input pixels 330) that are to spatially correspond to the two output pixels 320.

A first stage of example techniques, to produce the output pixels 320, may correspond to the first engine 102 and/or first instructions 202 in FIGS. 1 and 2. The first stage may determine an average gray value of a first set of input pixels 316 (avg_gray_upper of input 1 311, input 2 312, and input 3 313), and an average gray value of a second set of input pixels 317 (avg_gray_lower of input 3 313, input 4 314, and input 5 315). A weighting factor, $w_i$, may be applied to the first and/or second set of input pixels 316, 317. For example, the weights may be chosen to cause the central input pixels (e.g., the third set of input pixels 330) to have more influence on the average gray values than the extra input pixels. The weighted average gray values may be compared to a threshold, that may be chosen to take into account the weighting. Based on the comparison, for the first/second pixel groups, a minimum/maximum (MIN/MAX) operator may be applied to select an output pixel gray value from among the gray values of the third set of input pixels 330. These approaches may ensure that high contrast edge pixels are not compromised/lost. For example, a single black input pixel would be preserved on a white background of multiple other input pixels. Similarly, a single white input pixel would be preserved on a black background of multiple input pixels.

More specifically, in an example first stage (which may correspond to first engine 102/first instructions 202 of FIGS. 1 and 2), the avg_gray_upper may be defined as i1*w1+ i2*w2+i3*w3, where i1, i2, and i3 represent input pixel grayscale values, and w1, w2, and w3 represent weight values (weight values also may affect the total sum in a way that results in an average total sum, e.g., by accomplishing division through multiplication as explained in more detail below). The avg_gray_lower may be defined as i3*w3+ i4*w4+i5*w5, where i3, i4, and i5 represent input pixel grayscale values, and w3, w4, and w5 represent weight values. Output pixel values (o1, o2) may be assigned by the first stage as follows. If avg_gray_upper is less than or equal to threshold T1, then o1 may be assigned as MIN(i2, i3), otherwise o1 may be assigned as MAX(i2, i3). If avg_gray_lower is less than or equal to T1, then o2 may be assigned as MIN(i3, i4), otherwise o2 may be assigned as MAX(i3, i4).

The weights w1, w2, w3, w4, and w5, and the threshold T1, may be assigned as appropriate for a given application. For example, with text that includes a thin serif on a character, it may be desirable to ignore or grow particular pixels to preserve that thin input image characteristic. It may be desirable to grow the bottom of that character downward when scaling, or grow the bottom of that character up when scaling, which may depend on whether a given pixel is in isolation, or if there is a feature above or below that pixel. The weights and threshold may be chosen to influence such decisions, which may affect whether to assign a value of output 1 321 and/or output 2 322. In an example, the extra pixels (i1 and i5, corresponding to input 1 311 and input 5 315) may be assigned a smaller weight (w1, w5), relative to the weights given to pixels i2, i3, and i4 (w2, w3, w4). For example, the weights may be given integer values such as w1=5, w2=10, w3=10, w4=10, and w5=5. Thus, the central input pixels (third set of input pixels 330, i2, i3, i4) are weighted relatively more than the outside/extra input pixels input 1 311 and input 5 315 (here, weighted twice as much based on weight values of 5 and 10). Accordingly, this example illustrates a predominant weighting of the center input pixels (third set of input pixels 330), with some influence from the extra input pixels i1, i5, when assigning gray values to the output pixels 320. In alternate examples, the weights may be chosen to equally weigh the input pixels 310, or place relatively greater weight on the extra pixels. The weights may be varied over time and/or location (e.g., whether the set of input pixels are at an edge or non-edge portion of an image), and may be hard-coded or programmed (e.g., based on a lookup), according to desired implementation details.

Example approaches may re-characterize operations to take advantage of processor efficiencies for performance enhancements. For example, divides may be slow in computer time, but multiplies and adds may be fast. Accordingly, a division by a given value may be re-characterized as a multiplication by a ratio of that value (e.g., when multiplying by weights to obtain an average). An average (such as the avg_gray_upper and avg_gray_lower, as set forth above) may be re-characterized by summing values that have been multiplied by weights, using a corresponding threshold that is scaled in view of the weights, and canceling common factors to normalize values. Thus, naming conventions for values and expressions as used herein may correspond to expressions that have been re-characterized mathematically, and other specific expressions may be used to obtain the desired results and features as described herein.

The threshold T1 set forth above may be expressed as a percentage (e.g., 50%) or value (e.g., a gray value of 127 to represent 50% in an 8-bit grayscale value). The threshold also may be influenced by the choice of weights. For example, the weights may be chosen to effectively perform a division, as part of determining an average based on fast addition and multiplication operations that avoid division operations, wherein the threshold may be correspondingly adjusted to compensate for such recharacterizing.

Upon applying the first stage to the input pixels 310 and output pixels 320 set forth above, it is possible that a single pixel of the input image (such as from a line in an input image that is contributing the input pixels 310) will 'grow' into two pixels in the output image (created from the output pixels 320). For example, an isolated black pixel at i3 (input 3 313 having a very dark or black value gray i3) will spatially lie between output 1 321 and output 2 322. Accordingly, that single black input pixel may influence both gray values o1 and o2 of the output pixels 321, 322. To address this possibility, a second stage may be applied to the output pixels 320. The second stage is to check an average gray level of the output pixels 320, against an average gray level of the third set of input pixels 330.

As with other expressions/relationships, it is possible to re-arrange comparisons and values set forth above to obtain mathematically equivalent expressions. For example, it is possible to exchange expressions on opposite sides of a greater than or less than comparison while reversing a corresponding min/max expression, and so on.

A second stage of example techniques may be applied, to compare an average gray tone/value of the third set of input pixels 330 (i2, i3, i4) to an average gray tone/value of the pair of output pixels 320 (o1, o2). If the average gray level of the output pixels 320 is larger than that of the input, this may indicate that the pair of output pixels 320 is at risk of appearing too light (e.g., having a too-high gray value). For example, the input pixels 310 may include a single black pixel on a white background, whose average input gray value would be somewhat light. Determining the output pixels based on such input pixels may end up with no black pixels (all white output pixels), which would be a relative mismatch. The inverse situation similarly would be a relative mismatch, based on an input set of pixels having a single white pixel on a black background that gets converted into two black output pixels. Accordingly, the second stage may be applied to perform a correction to the upper output pixel 321 (o1) and/or the lower output pixel 322 (o2), e.g., based on using the min( ) or max( ) operator in view of identified differences between the average gray level of the output pixels 320 being different than that of the input pixels (e.g., the third input set 330, and/or the entire set of input pixels 310). Example systems may therefore perform well and provide symmetric and accurate results, regardless of whether a print system is based on an additive approach such as black on white, or a subtractive approach such as white on black (e.g., systems provided by a given printer's ASIC implementation, whether additive or subtractive).

In an example second stage (which may correspond to second engine 103/second instructions 203 of FIGS. 1 and 2), the sum_upper may be assigned a gray value corresponding to i2+i3, and sum_lower may be assigned i3+i4. The avg_tone_in may be assigned a value of $(i2+i3+i4)*\frac{1}{3}$, and the avg_tone_out may be assigned a value of $(o1+o2)*\frac{1}{2}$. If the avg_tone_out is less than avg_tone_in, and the sum_upper is less than sum_lower, then o2 is assigned as MAX(i2, i3, i4). If the avg_tone_out is less than avg_tone_in, and the sum_upper is not less than sum_lower, then o1 is assigned as MAX(i2, i3, i4). If the avg_tone_out is greater than avg_tone_in, and the sum_upper is greater than the sum_lower, then o2 is assigned as MIN(i2, i3, i4). If the avg_tone_out is greater than avg_tone_in, and the sum_upper not greater than the sum_lower, then o1 is assigned as MIN(i2, i3, i4).

Thus, the example second stage may identify and correct situations where the output pixels 320 have 'grown' a single input pixel to two output pixels, which would appear as a thickening of a single-pixel line of an input image into a 2-pixel line in the output image, or situations where the output has caused an input detail to be negatively affected (such as disappearing). Such issues may be identified based on detecting the discrepancy between the input average gray values and the output average gray values as set forth above.

The example stages may be applied to pixels throughout an input image, to provide pixels for an output image. For example, the example techniques may be applied as follows. A first pass through the input image may use the first three rows of pixels from the input image to generate the first two rows of pixels for the output image, proceeding column by column for those first three rows. Then, the next pass is to proceed to the next three rows of the input image (which would be input rows four, five, and six), and generate the next two rows of pixels for the output image (which would be output rows three and four). For that second pass, the first input pixel 311 (i1) would actually be row 3 of the input image, and i5 would be row 7 of the input image. The next pass would similarly jump another 3 rows down in the input image, such that each pass uses an extra input pixel from the row above, and an extra input pixel from the row below, compared to the current 3 input rows (i2, i3, i4) of interest that are being scaled to the two output rows. This approach is repeated for the remaining portion of the input image. Upon reaching an end of the input image, example approaches may disregard less than three remaining rows, or pad the less than three remaining rows to provide three rows that may be downscaled to two rows.

The example approaches described herein are not limited to a single dimension. Although an example printer application may speed throughput by applying such resolution downscaling in a vertical axis/dimension along which the output media advances, other examples may apply such scaling techniques in a horizontal axis/dimension (or both dimensions).

The approaches also are not limited to grayscale images, and may be applied to color or black-and-white images. Although the examples set forth above are described in terms of grayscale values, a black-and-white image may be described in grayscale terms, e.g., by using maximum and minimum grayscale values. Similarly, a color image may be expressed as multiple color channels (e.g., three channels of red, green, blue (RGB), four channels of cyan, magenta, yellow, black (CMYK), etc.), where a given color channel may be expressed as a value having a tone range, similar to a grayscale value. Accordingly, the example approaches may be applied to a color channel independently in series, or together in parallel. Thus, examples described herein that reference grayscale or black-and-white are meant to also include color applications.

Figure 4:
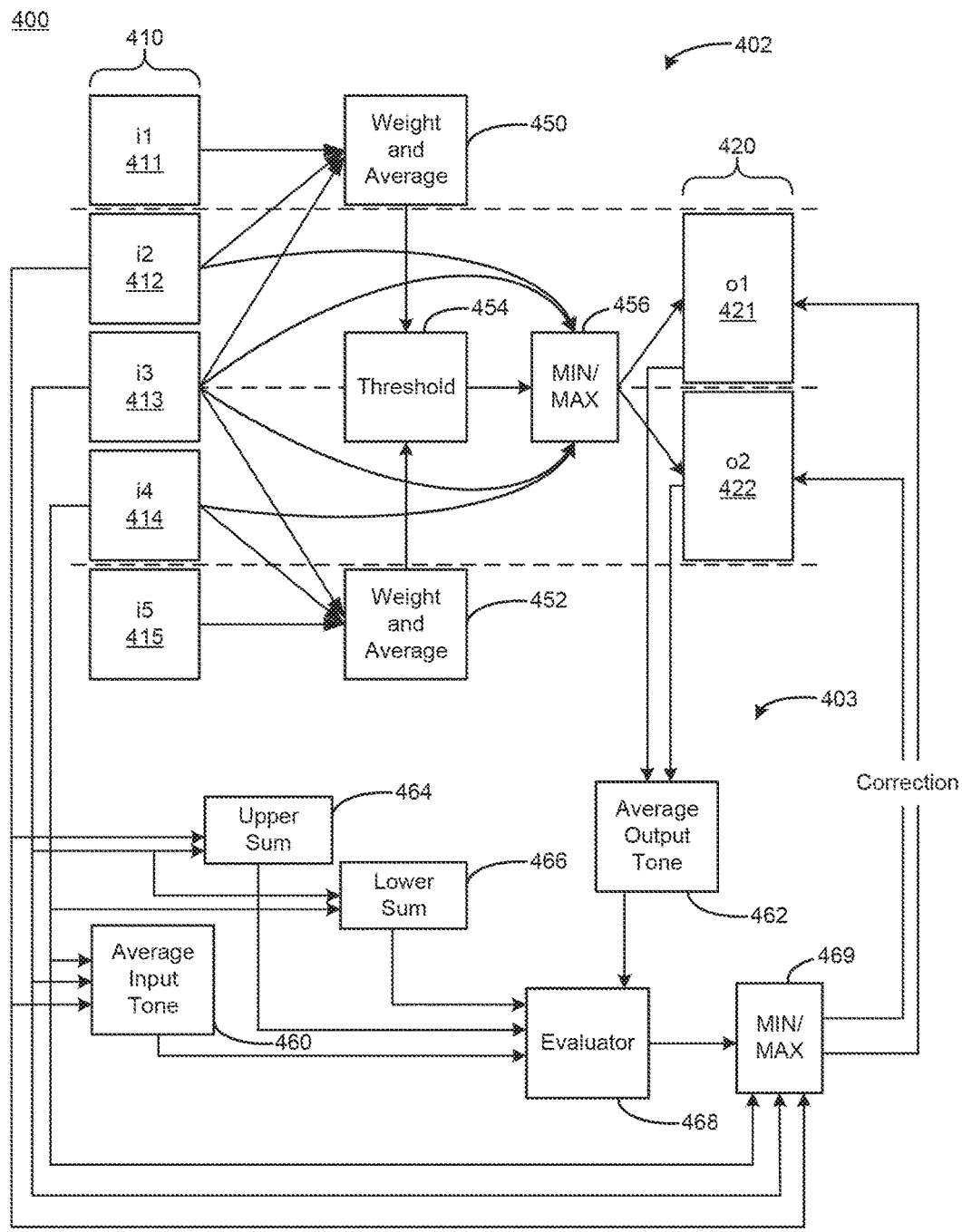
FIG. 4 is a block diagram of a system including a first engine and a second engine according to an example.

FIG. 4 is a block diagram of a system 400 including a first engine 402 and a second engine 403 according to an example. The first engine 402 is to receive the input pixels 410 (including i1 411, i2 412, i3 413, i4 414, and i5 415), and includes first and second weight and average blocks 450, 452, threshold block 454, and min/max block 456, to produce the output pixels 420 (including o1 421 and o2 422).

The second engine 403 includes average input tone block 460, average output tone block 462, upper sum block 464, lower sum block 466, evaluator block 468, and min/max block 469, to selectively produce/apply correction to the output pixels 420.

In the first engine 402, the first weight and average block 450 is to weight and average i1, i2, and i3, and provide the result to the threshold block 454. The second weight and average block 452 is to weight and average i3, i4, and i5, and provide the result to the threshold block 454. The threshold block 454 is to identify whether such results are not greater than a threshold. The results of the threshold comparison are passed to the min/max block 456 that, depending on the comparison results, assigns o1 to be either the minimum or maximum of i2, i3, and assigns o2 to be either the minimum or maximum of i3, i4.

Thus, the first engine 402 may accomplish the approach set forth above regarding the first stage. Five input pixels 410 are considered (including extra pixels). A weighted combination of input pixels i1, i2, and i3 are used to determine a gray upper average, at weight and average block 450, and similarly, a weighted combination of the input pixels i3, i4, and i5 are used to determine the gray lower average, at weight and average block 452. If the gray upper average is less than or equal to a threshold, min/max block 456 is to assign o1 421 a minimum function from among i2, i3, otherwise assign the maximum of i2, i3 to o1. The gray lower average is similarly applied to o2 by the min/max block 456 regarding i3, i4.

In the second engine 403, the average input tone block 460 is to determine an average gray value (e.g., "tone") of i2, i3, and i4. The average output tone block 462 is to determine an average gray value (e.g., "tone") of o1 and o2. The average tone results are passed to the evaluator 468. Also passed to the evaluator 468 are the results of upper sum block 464 (based on summing i2 and i3) and lower sum block 466 (based on summing i3 and i4). The evaluator 468 may then determine whether the average output tone is less than or greater than the average input tone, for purposes of determining whether to assign gray correction to o1 and/or o2. If less than, the evaluator will instruct the min/max block 469 to assign, to at least one of o1 and o2, a maximum from among i2, i3, and i4. If greater than, the evaluator will instruct the min/max block 469 to assign, to at least one of o1 and o2, a minimum from among i2, i3, and i4. If equal, the output values are not reassigned. More specifically, if the evaluator 468 determines that the output of the upper sum block 464 is less than the output of the lower sum block 466, o2 is assigned the maximum of i2, i3, i4, otherwise o1 is so assigned. If the evaluator 468 determines that the output of the upper sum block 464 is greater than the output of the lower sum block 466, o2 is assigned the minimum of i2, i3, i4, otherwise o1 is so assigned.

Thus, the second engine 403 is to correct potential situations that may arise from the first engine 402, such as growing or shrinking/disappearing lines, that are present in the input image, when producing the output image. In other words, the second engine 403 may compare the average tone of the output pixels 420 (o1 and o2) to the average tone of the input pixels 410 (such as the third input set i2, i3, and i4). A mismatch between input and output tones may indicate a potential issue that may benefit from correction by the second engine 403. For example, if the evaluation by the upper sum block 464 is greater than evaluation by the lower sum block 466, the output pixel 422 (o2) can be corrected, otherwise the output pixel 421 (o1) can be corrected. Similarly, the upper/lower sum blocks may indicate that the output pixels should be corrected (e.g., based on taking the min/max of i2, i3, i4 according to the MIN/MAX block 469).

The engines 402, 403 may include and/or represent at least one of the engines as set forth above regarding FIG. 1, and the various blocks illustrated in FIG. 4 may be accomplished by software constructs and/or hardware constructs, including electrical circuitry, chip design features, and software programming/drivers.

FIG. 5 is a flow chart 500 based on generating output pixels according to an example. Although execution of flow chart 500 is described below with reference to input engine, first engine, second engine, and output engine, as described above, other suitable systems/approaches for the execution of flow chart 500 can be utilized. Additionally, implementation of flow chart 500 is not limited to such examples. Although the flow chart 500 of FIG. 5 shows a specific order of performance of certain functionalities, flow chart 500 is not limited to that order. For example, the functionalities shown in succession in the flow chart 500 may be performed in a different order, may be executed concurrently or with partial concurrence, or a combination thereof. In some examples, functionalities described herein in relation to FIG. 5 may be provided in combination with functionalities described herein in relation to any of FIGS. 1-4.

In block 510, an input engine of a printing device is to acquire an instruction to print on the printing device an input image having input pixels at a first resolution. For example, a printing device may receive an electronic representation of an image, as generated by a printer driver operating on a computing system that is coupled to the printing device. The first resolution may correspond to a native capability of the printing device.

In block 520, a first engine is to generate first and second output pixels based on a comparison of a first average gray value of a first set of the input pixels to a threshold, and a comparison of the threshold to a second average gray value of a second set of the input pixels. For example, the first set of input pixels may include first, second, and third input pixels. The gray values of the first set of input pixels may be weighted (based on multiplication with a weight) and summed, to generate the first average gray value, without a need to perform a division operation, while adjusting a relative value of a subset of the first set of input pixels. The threshold may be chosen according to a given application, such as whether the input image is line art, text, image, grayscale, color, etc. The first engine may apply a similar approach described above for the first, second, and third input pixels, while using a different set of weights and/or thresholds suitable for the second set of input pixels (e.g., the third, fourth, and fifth input pixels).

In block 530, a second engine is to identify a third set of the input pixels corresponding spatially to the first and second output pixels. The first set of the input pixels includes a first extra pixel, and the second set of the input pixels includes a second extra pixel, adjacent to the third set of the input pixels. For example, the third set of input pixels may be second, third, and fourth input pixels, from among first through fifth input pixels. Accordingly, a 3:2 downscaling may be achieved, based on the spatial correspondence between the three ('middle') input pixels and the two output pixels. The first extra pixel may be adjacent to a first side of the third set of input pixels, and the second extra pixel may be adjacent to a second side of the third set of input pixels. For example, the first input pixel i1 may be the first extra pixel, and the fifth input pixel i5 may be the second extra pixel.

In block 540, the second engine is to selectively reassign a gray value of at least one of the first and second output pixels in response to comparing an average input gray value of the third set of the input pixels to an average output gray value of the output pixels, to preserve single-pixel features. For example, the second engine may compare average tone values of groupings of spatially corresponding input and output pixels, to identify whether the first engine undesirably altered any high-contrast image features (such as single-pixel lines on a high-contrast background). The second stage may identify an issue with output of the first stage, and may address the issue by maintaining a consistency between the appearance of the input pixels and the output pixels (e.g., maintaining a single-pixel line of the input image, without doubling it or eliminating it in the output image).

In block 550, an output engine is to provide an output image to a print assembly having a second resolution lower than the first resolution. The output image is generated based on the output pixels at the second resolution. For example, the output engine may repeatedly apply the first and second engines to address the various pixels throughout the image, e.g., passing through the various rows and columns of the input image to identify input pixels, and obtain the corresponding output pixels, to form a downscaled output image. The downscaled output image enables an output device to achieve enhanced efficiency and speed when outputting the output image.

What is claimed is:

1. A printing device comprising:
   an input engine to acquire an input print image having input pixels at a first resolution to be printed by the printing device;
   a first engine to generate first and second output pixels based on a comparison of a first average gray value of a first set of the input pixels to a threshold, and a comparison of the threshold to a second average gray value of a second set of the input pixels;
   a second engine to selectively reassign a gray value of at least one of the first and second output pixels in response to a comparison of an average input gray value, of a third set of the input pixels, to an average output gray value of the output pixels; and
   an output engine to provide, to a print assembly having a second resolution lower than the first resolution, an output image, at the second resolution, generated based on the output pixels,
   wherein the first set of the input pixels and the second set of the input pixels overlap.

2. The device of claim 1, wherein the print assembly is to, in response to the generation of the output image, print the output image at an increased speed that is proportional to the difference between the first resolution and the second resolution, to meet performance needs of real-time print operations.

3. The device of claim 1, wherein the first average gray value is based on a sum of weighted gray values of the first set of the input pixels that are weighted according to a first set of weights, and wherein the second average gray value is based on a sum of weighted gray values of the second set of the input pixels that are weighted according to a second set of weights.

4. The device of claim 3, wherein a weight, of the first set of weights and the second set of weights, is relatively greater according to whether the weight is assigned to a member of the third set of the input pixels.

5. The device of claim 1, wherein, in response to identifying that the first average gray value is not greater than the threshold, the first engine is to assign the first output pixel a minimum gray value from among gray values corresponding to a first subset of the first set of the input pixels; and
wherein, in response to identifying that the first average gray value is greater than the threshold, the first engine is to assign the first output pixel a maximum gray value from among the gray values corresponding to the first subset.

6. The device of claim 1, wherein, in response to identifying that the second average gray value is not greater than the threshold, the first engine is to assign the second output pixel a minimum gray value from among gray values corresponding to a second subset of the second set of the input pixels; and
wherein, in response to identifying that the second average gray value is greater than the threshold, the first engine is to assign the second output pixel a maximum gray value from among the gray values corresponding to the second subset.

7. The device of claim 1, wherein, in response to identifying that the average output gray value is less than the average input gray value, the second engine is to reassign the gray value of at least one of the first and second output pixels as a maximum value among the third set of the input pixels, and
wherein, in response to identifying that the average output gray value is greater than the average input gray value, the second engine is to reassign the gray value of at least one of the first and second output pixels as a minimum value among the third set of the input pixels.

8. The device of claim 7, wherein the second engine is to reassign the gray value of the first and second output pixels according to a comparison between a first sum of gray values of the first subset, and a second sum of gray values of the second subset.

9. The device of claim 1, wherein the output image is two dimensional, and includes a first resolution along a first dimension that is not equal to a second resolution on a second dimension, based on unequal dimensions of the first and the second output pixels.

10. A method comprising:
acquiring, by an input engine of a printing device, an instruction to print on the printing device an input image having input pixels at a first resolution;
generating, by a first engine, a first output pixel based on a comparison of a first average gray value of a first set of the input pixels to a threshold;
generating, by the first engine, a second output pixel based on a comparison of a second average gray value of a second set of the input pixels to the threshold;
providing, by an output engine, an output image to a print assembly having a second resolution lower than the first resolution, the output image generated based on the first and second output pixels;
identifying, by a second engine, a third set of the input pixels corresponding spatially to the first and second output pixels, wherein the first set of the input pixels includes a first extra pixel, and the second set of the input pixels includes a second extra pixel, adjacent to the third set of the input pixels; and
selectively reassigning, by the second engine, a gray value of at least one of the first and second output pixels in response to comparing an average input gray value of the third set of the input pixels to an average output gray value of the output pixels, to preserve single-pixel features,
wherein the first set of the input pixels and the second set of the input pixels overlap.

11. The method of claim 10, further comprising generating, by the first engine, the first average gray value based on weighting the first set of the input pixels unequally, to favor a first subset of the input pixels in common with the third set of the input pixels.

12. The method of claim 10, further comprising generating, by the first engine, the second average gray value based on weighting the second set of the input pixels unequally, to favor a second subset of the input pixels in common with the third set of the input pixels.

13. A non-transitory machine-readable storage media encoded with instructions executable by a computing system that, when executed, cause the computing system to:
acquire an input print image having input pixels at a first resolution to be printed by a printing device;
generate a first output pixel based on a comparison of a first average gray value, of a first set of the input pixels, to a threshold;
generate a second output pixel based on a comparison of a second average gray value, of a second set of the input pixels, to the threshold;
selectively reassign a gray value of at least one of the first and second output pixels in response to comparing an average input gray value of a third set of the input pixels to an average output gray value of the output pixels, to preserve single-pixel features; and
provide, to a print assembly having a second resolution lower than the first resolution, an output image at the second resolution, generated based on the output pixels,
wherein the first set of the input pixels and the second set of the input pixels overlap.

* * * * *